Nov. 10, 1953   A. I. K. SLETTENGREN   2,658,574
TOOL HOLDER, PARTICULARLY FOR SHEET-METAL WORKING MACHINES
Filed July 8, 1948                        2 Sheets-Sheet 1
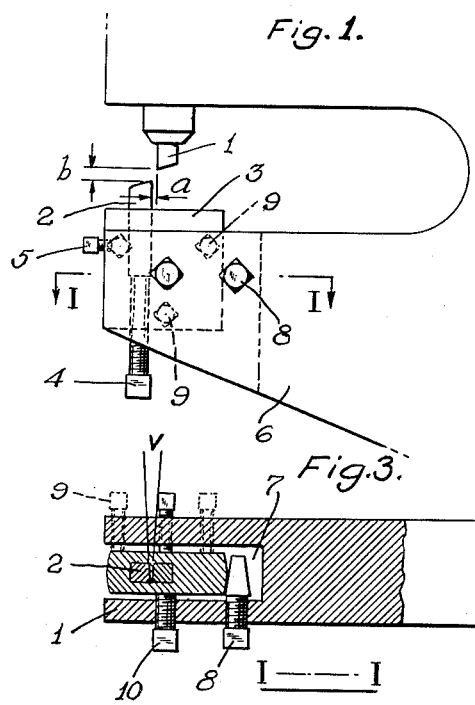
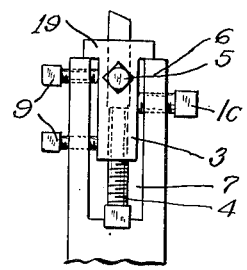
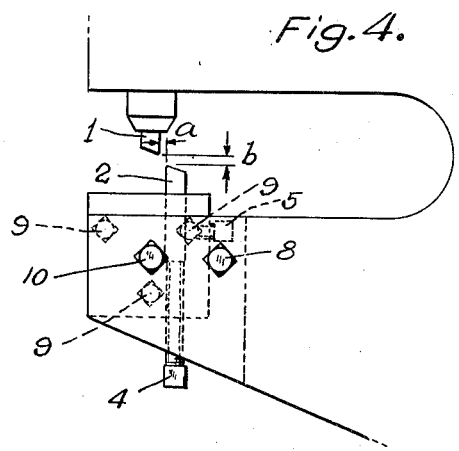
INVENTOR
ANDERS INGEMAR KNUTSSON SLETTENGREN
BY
ATTORNEY

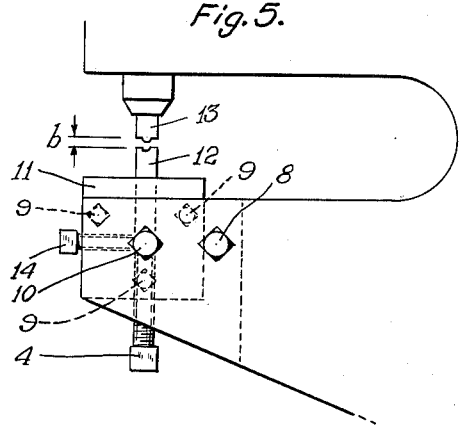
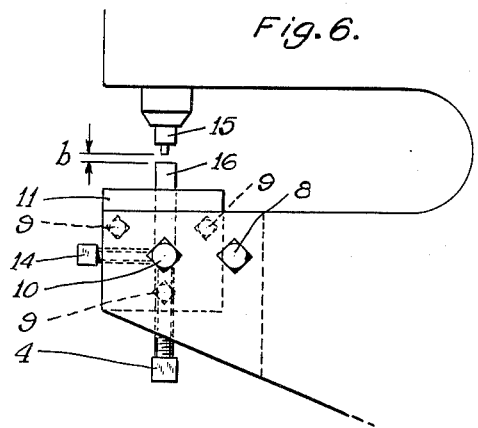
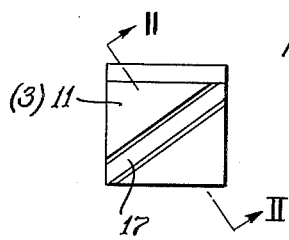
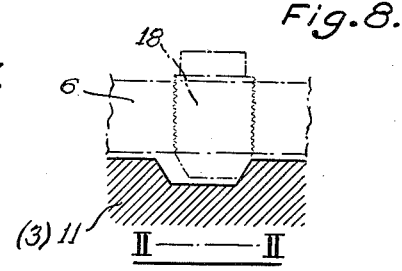

Patented Nov. 10, 1953

2,658,574

UNITED STATES PATENT OFFICE 2,658,574

TOOL HOLDER, PARTICULARLY FOR SHEET-METAL WORKING MACHINES

Anders Ingemar Knutsson Slettengren, Goteborg, Sweden, assignor, by mesne assignments, to Aktiebolaget Svetsmekano, Goteborg, Sweden, a limited company of Sweden Application July 8, 1948, Serial No. 37,684

Claims priority, application Sweden July 25, 1947

2 Claims. (Cl. 164—58)

The present invention relates to tool holders, particularly for sheet-metal working machines and has for its primary object to provide simple and yet efficient means for the ready adjustment and, if desired, easy exchange of cooperating tools.

In such machines for the shearing of sheet-metal which are provided with two substantially parallelepipedic cutting tools operating against each other in the longitudinal direction (cf. U. S. Patents Nos. 2,374,625 and 2,386,652), it is important that the tools (shears) permit of being adequately adjusted relative to one another, the following facilities of adjustment, above all, coming then into consideration: the lower tool is placed outside the upper tool (counted from the frame gap), the lower tool is placed inside the upper tool (counted likewise from the frame gap); and the lower tool is placed right beneath the upper tool (in working operations performed with chasing, folding, punching and similar tools).

In each one of these cases, the following fine adjustments should be feasible: adjustment of the tools in the lateral direction in relation to each other; adjustment of the tools in the vertical direction in relation to each other, counted, for instance, between the points of the tools, when the upper tool, being movable with a certain length of stroke, takes its bottom position, and adjustment of a suitable angle between the vertical cutting planes of the tools (cf. U. S. Patent No. 2,182,162).

The invention relates to a tool holder possessing the above-stated adjusting facilities, particularly for the stationary (lower) tool in machines as per above, and the invention is distinguished, inter alia, by a block adapted to carry the tool and to be adjusted horizontally in all directions relatively to the machine frame, in which block the tool may be adjusted vertically, the block and the machine frame being formed in such manner that the block may be readily removed for replacement, and the fine adjustment being at the same time obtained in each principal position by the fact that the block bears against common adjustable abutments provided in the frame.

The invention will be described more closely with reference to the accompanying drawings, which represent an example of embodiment of the invention given for purely illustrative, but not limiting purposes. In the drawings, Fig. 1 is a side elevation of the tool holder having the lower tool located outside the upper tool, this figure also showing a portion of the upper tool and its holder. Fig. 2 is a front view of the tool holder. Fig. 3 shows the tool holder viewed from above in section on line I—I in Fig. 1. Fig. 4 shows the tool holder with the lower tool located inside the upper tool. Fig. 5 shows the tool holder with the tools located underneath one another. Fig. 6 shows the tool holder with special tools for punching operations. Fig. 7 is a side elevation of the block with a clamping groove therein, and Fig. 8 shows a section through said groove.

According to Fig. 1, the tool 1 is movable and the tool 2 stationary. The tool 2 is movable vertically in a guide provided in the block 3, and may be adjusted by means of a screw 4 to the vertical distance $b$ and be locked by means of a screw 5. As shown in Fig. 2, the block rests with its outwardly projecting borders 19 on the lower shank 6 of the frame and is located with a certain horizontal play within the gap 7 in the frame. The block 3 bears inwardly against the adjustable conical rotary wedge 8, by means of which the lateral distance $a$ between the tools may be varied, and also bears on the screws 9, through which the angular adjustment of the block 3 may be varied so as to permit a suitable angle $v$ between the cutting planes of the tools 1 and 2 and any adjustment of the position in the transverse direction toward the frame 6 to be performed. The block 3 is ultimately locked by means of the screw 10.

In Fig. 4, the block 3 is turned by 180° relatively to the position shown in Fig. 1, whereby the tool 2 will be located inside the tool 1. The tool 1 is also turned by 180°. By suitable dimensioning the block, the same lateral distance $a$, the same vertical distance $b$, and the same angle $v$ will be obtained in this case directly, without any manipulation of the set screws 4, 8 and 9.

According to Fig. 5, the block 11 is formed for a lower tool 12 placed centrally below an upper tool 13. The tools 12 and 13 are intended for the effectuation of chased grooves in sheet-metal. The tool 12 will be locked by screw 14. As in the preceding case, the vertical distance $b$ is adjusted with the aid of the screw 4, while the lateral adjustment between the tools is performed with the aid of the conical wedge 8. Adjustment in the transverse direction is effected by means of the screws 9 and the locking of the block 11 by means of the screw 10.

In Fig. 6, the tool holder is mounted with tools for successive punching or so-called nibbling operations. The upper tool 15 is constituted by a circular punch operating against a die 16 (not shown in detail). In this case, the punch and the die must be centered accurately relative to each other. The die 16 is formed to fit in the block 11, the same block being preferably used as for the previously mentioned chasing tool 12. The centering of the tools is effected by the screws 9 and the conical wedge 8. Vertical adjustments are effected by the screw 4.

Fig. 7 shows an arrangement to direct the pressure of the block in the setting operation, partly against the machine frame underneath the projecting border, and partly against the adjustable abutments, a groove 17 with oblique edges being provided in the side of the blocks 3 and 11, respectively. The groove is shown in section in Fig. 8, which also shows a screw 18 provided with a conical point, which is adapted to be screwed inwardly toward the block from the side of the frame. The screw 18 corresponds to the screw 10 and constitutes a modification thereof.

An advantage of the invention as disclosed resides in the fact that it facilitates a very rapid and convenient exchange and adjustment of different tools, in as much as tools for replacement may be kept at hand ready-mounted in blocks, all requisite adjustments permitting of being performed at the maintenance of a simple construction. It should be observed, in particular, that all changes of the position between the tools in the horizontal plane may be effected within the limits occurring in practice.

Although the invention has been described in connection with a form of embodiment, having vertically operating tools, as shown in the drawings, it may of course be applicable just as well, if the tools are operating in some other direction.

In the appended claims reference is made to the drawing by means of reference numerals within brackets but it is to be understood that this is done only for facilitating the reading of the claims and not for the purpose of limiting the scope of claims.

What is claimed is:

1. In a shearing machine having a pair of shearing tools provided with cutting edges cooperating rectilinearly on mutually parallel, laterally-displaced shafts, one of said tools being stationary and one of said tools being axially movable, whereby to effect a shearing action by the relative passage of the cutting edges of each tool, a tool holder comprising a unitary block having a top, a bottom and two pairs of opposite parallel sides, a seat in said block adapted to receive one of said tools, said seat being offset laterally of the central longitudinal axis of said block, and clamping means for securing said tool in said seat, a support having a slot open at one end for receiving said block, said support including an abutment surface engageable with one of the sides of a first of said pairs of sides and a setting member engageable with the opposite side of said first pair of sides to press the block against said abutment surface, and an adjustable stop element extending transversely of said slot and having a tapering surface engageable with one of the sides of the second of said pairs of sides for positioning said block relative to said support, said support being adapted to accommodate the block in two fixed positions angularly displaced by 180°, the central longitudinal axis of the block in both of said positions coinciding substantially with the longitudinal axis of the other of said tools, whereby the offset position of the tool in the block permits the tools to be automatically presentable in two different shearing positions.

2. A tool holder as defined in claim 1, wherein an elongated recess having a longitudinal axis making an oblique angle with the longitudinal axis of the block is provided in at least one of said first pair of sides of said block for engagement with said setting member.

ANDERS INGEMAR KNUTSSON
SLETTENGREN.

References Cited in the file of this patent

UNITED STATES PATENTS

| Number | Name | Date |
| --- | --- | --- |
| 84,468 | Austin | Dec. 1, 1868 |
| 292,725 | Wisdom | Jan. 29, 1884 |
| 493,890 | Hoolahan | Mar. 21, 1893 |
| 612,372 | Webb | Oct. 11, 1898 |

FOREIGN PATENTS

| Number | Country | Date |
| --- | --- | --- |
| 595,450 | Great Britain | Jan. 27, 1945 |